(12) United States Patent
Abramov et al.

(10) Patent No.: US 9,834,389 B2
(45) Date of Patent: Dec. 5, 2017

(54) METHODS AND APPARATUS FOR FABRICATING GLASS RIBBON OF VARYING WIDTHS

(71) Applicant: Corning Incorporated, Corning, NY (US)

(72) Inventors: Anatoli Anatolyevich Abramov, Painted Post, NY (US); Donald Orrin Bigelow, Honeoye Falls, NY (US); Chester Hann Huei Chang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/647,283

(22) PCT Filed: Nov. 26, 2013

(86) PCT No.: PCT/US2013/071777
§ 371 (c)(1),
(2) Date: May 26, 2015

(87) PCT Pub. No.: WO2014/085357
PCT Pub. Date: Jun. 5, 2014

(65) Prior Publication Data
US 2015/0315059 A1    Nov. 5, 2015

Related U.S. Application Data

(60) Provisional application No. 61/731,164, filed on Nov. 29, 2012.

(51) Int. Cl.
*C03B 33/09* (2006.01)
*B65G 49/06* (2006.01)
(Continued)

(52) U.S. Cl.
CPC ......... *B65G 49/065* (2013.01); *B65H 23/044* (2013.01); *B65H 23/1955* (2013.01);
(Continued)

(58) Field of Classification Search
CPC . C03B 33/091; C03B 33/0235; C03B 33/102; C03B 33/033; C03B 23/0235;
(Continued)

(56) References Cited

U.S. PATENT DOCUMENTS

| 4,018,372 A | 4/1977 | Insolio |
| 4,948,025 A | 8/1990 | Lisec |

(Continued)

FOREIGN PATENT DOCUMENTS

| JP | 2006082176 A | 3/2006 |
| JP | 2009078502 A | 4/2009 |

(Continued)

OTHER PUBLICATIONS

Eurpoean Patent Office Seasrch Report EP13857756.4-1355 dated Jul. 29, 2016 7 pgs.
(Continued)

*Primary Examiner* — Queenie S Dehghan
(74) *Attorney, Agent, or Firm* — Jeffrey A. Schmidt (57) ABSTRACT

Methods and apparatus provide for sourcing a glass web, the glass web having a length and a width transverse to the length; continuously moving the glass web from the source to a destination in a transport direction along the length of the glass web; and cutting the glass web at a cutting zone into at least first and second glass ribbons as the glass web is moved from the source to the destination, the first glass ribbon having a first width and the second glass ribbon having a second width, where the first and second widths are not equal.

18 Claims, 5 Drawing Sheets

(51) Int. Cl.
  *C03B 33/10* (2006.01)
  *C03B 23/023* (2006.01)
  *B65H 35/02* (2006.01)
  *B65H 23/04* (2006.01)
  *C03B 33/023* (2006.01)
  *B65H 23/195* (2006.01)
  *C03B 17/06* (2006.01)
  *C03B 33/033* (2006.01)

(52) U.S. Cl.
  CPC ......... *B65H 35/02* (2013.01); *C03B 23/0235* (2013.01); *C03B 33/0235* (2013.01); *C03B 33/091* (2013.01); *C03B 33/102* (2013.01); *B65G 2249/04* (2013.01); *B65H 2301/4148* (2013.01); *B65H 2801/61* (2013.01); *C03B 17/064* (2013.01); *C03B 33/033* (2013.01); *C03B 2225/02* (2013.01); *Y02P 40/57* (2015.11)

(58) Field of Classification Search
  CPC ... B65H 35/02; B65H 23/1955; B65H 23/044
  See application file for complete search history.

(56) References Cited

U.S. PATENT DOCUMENTS

| | | | |
|---|---|---|---|
| 6,502,423 | B1 | 1/2003 | Ostendarp et al. |
| 6,775,910 | B1 * | 8/2004 | Coffey ................. B26D 1/035 29/895.211 |
| 8,053,704 | B2 | 11/2011 | Abramov et al. |
| 2005/0268655 | A1 | 12/2005 | Butts et al. |
| 2006/0191970 | A1 | 8/2006 | Kataoka et al. |
| 2010/0107848 | A1 | 5/2010 | Joseph, III et al. |
| 2011/0198378 | A1 * | 8/2011 | Chang ................. B65G 49/063 226/7 |
| 2012/0017642 | A1 | 1/2012 | Teranishi et al. |
| 2012/0131962 | A1 * | 5/2012 | Mitsugi ............... C03B 33/0235 65/112 |
| 2012/0247154 | A1 | 10/2012 | Abramov et al. |
| 2015/0218034 | A1 * | 8/2015 | Bigelow .................. B26D 7/18 156/271 |

FOREIGN PATENT DOCUMENTS

| | | |
|---|---|---|
| JP | 2011116611 A | 6/2011 |
| JP | 2011144092 A | 7/2011 |
| JP | 2011144093 A | 7/2011 |
| JP | 2011241125 A | 12/2011 |
| JP | 2012096936 A | 5/2012 |
| KR | 2009128083 A | 12/2009 |
| WO | 0214229 A1 | 2/2002 |
| WO | 2009093505 A1 | 7/2009 |
| WO | 2010038757 A1 | 4/2010 |
| WO | 2010038758 A1 | 4/2010 |
| WO | 2010038759 A1 | 4/2010 |
| WO | 2010038760 A1 | 4/2010 |
| WO | 2010038761 A1 | 4/2010 |
| WO | 2012017988 A | 2/2012 |
| WO | 2013025741 A1 | 2/2013 |
| WO | 2013074760 A1 | 5/2013 |

OTHER PUBLICATIONS

International Search Report and Written Opinion PCT/US2013/071777 dated Mar. 20, 2014.
English Translation of JP2015545181 Office Action Dated Aug. 15, 2017; 5 pages; Japanese Patent Office.

* cited by examiner

METHODS AND APPARATUS FOR FABRICATING GLASS RIBBON OF VARYING WIDTHS

This application claims the benefit of priority under 35 U.S.C. §371 of International Patent Application Serial No. PCT/US13/71777 filed on Nov. 26, 2013, designating the United States of America, which claims the benefit of priority under 35 U.S.C. §119 of U.S. Provisional Application Ser. No. 61/731,164, filed on Nov. 29, 2012, the content of each of which is relied upon and incorporated herein by reference in its entirety.

BACKGROUND

The present disclosure relates to methods and apparatus for fabricating glass ribbon of various widths from a web of glass material.

Continuous processing of ultra-thin glass web, such as glass web measuring less than about 0.3 mm, is a relatively new field and presents a number of manufacturing challenges. A conventional process for producing such web includes employing a roll-to-roll technique in which the glass web is conveyed in a continuous transport between the supply roll and the take-up roll. In order to produce final products, such as glass for flat panel displays or other products, the glass web must be cut into appropriately sized widths and lengths. Conventional approaches for cutting the glass web, however, have not provided for the ability to cut arbitrarily widths in the continuous transport system.

Accordingly, there are needs in the art for new methods and apparatus for fabricating glass ribbon of various widths from a web of glass material.

SUMMARY

The present disclosure relates to separating ultra-thin glass web into multiple web (or ribbon) widths during continuous transport. A laser cutting technique may be employed to slit the glass web to remove web fusion beads (i.e., the beads that are located at the peripheral edges of the glass web) during transport. Indeed, the final piece parts delivered to customers often must exhibit very fine, particle free edges, with minimal edge defects and/or edge corner defects. After removal of the beads, the remaining glass web is still quite wide, far wider than the delivered width of a final piece part for a customer. Additionally, customers often require different ribbon widths, and therefore, the glass web has to be cut again into narrower widths.

It is challenging to simultaneously achieve a number of desirable features, including: (i) high glass utilization during the process, (ii) efficient use of the continuous transport process (i.e., eliminating multiple passes), and (iii) capability to produce a variety of ribbon widths. Indeed, while meeting the above features would result in significant manufacturing cost reductions and resultant increases in market share, the techniques required to achieve such features in practice are not available in conventional systems.

In accordance with one or more embodiments herein, new methods and apparatus have been developed in which at least two ribbons of different widths may be simultaneously cut in a continuous transport process using an asymmetrical separation technique. Notably, the separation of the glass web into two ribbons of asymmetrical widths will introduce the potential for stress and strain variations due to unequal loading and/or micro-motion (e.g., vibrations) in the zone(s) near the cutting elements (e.g., near the lasers). The glass web, however, due to its characteristics of high modulus, notch sensitivity and brittleness, requires very consistent and symmetrical stress and strain fields in the vicinity of the separation (cut tip) in order to exhibit suitable edge characteristics (minimal strength reducing flaws) after cutting. Therefore, in order to separate the glass web into multiple ribbons of unequal widths, the continuous transport and support system must provide consistent and symmetric stress fields and strain fields in the area(s) of laser separation. In accordance with one or more embodiments herein, tensioning is carefully and independently controlled in each of the ribbons in order to achieve the consistent and symmetric stress and strain fields. This approach results in a very fine, particle free edge that minimizes edge and/or edge corner defects.

Advantages and benefits of one or more embodiments herein include any of the following: vibration of the glass web during conveyance and cutting is attenuated; cross tension generated in the cutting area is attenuated; very fine and particle free edge quality is achieved while minimizing edge and/or edge corner defects; variable customer quality and dimensioning requirements are achievable.

In accordance with one or more embodiments, methods and apparatus provide for: sourcing a glass web, the glass web having a length and a width transverse to the length; continuously moving the glass web from the source to a destination in a transport direction along the length of the glass web; and cutting the glass web at a cutting zone into at least first and second glass ribbons as the glass web is moved from the source to the destination, the first glass ribbon having a first width and the second glass ribbon having a second width, wherein the first and second widths are not equal.

The methods and apparatus may further provide for: applying a first force to place the first glass ribbon in a first tension; and applying a second force to place the second glass ribbon in a second tension, wherein the first and second forces are not equal. For example, a ratio of the first force to the first width is approximately equal to a ratio of the second force to the second width. The methods and apparatus may further provide for independently varying the first force and the second force such that stresses and strains in the cutting zone are symmetric for the first and second ribbons.

Additionally or alternatively, the methods and apparatus may further provide for monitoring the first tension and the second tension; determining whether the first tension and the second tension are within respective prescribed limits; and varying at least one of the first force and the second force based on the determination to ensure that the first tension and the second tension are within the respective prescribed limits.

The methods and apparatus may further provide that cutting the glass web at the cutting zone includes heating an elongated zone of the glass web using an optical delivery apparatus followed by cooling the heated portion of the glass web to propagate a fracture in the transport direction, thereby producing the first and second ribbons.

The methods and apparatus may further provide for bending the glass web in the cutting zone, wherein such bending is one of: convex and concave.

Other aspects, features, and advantages will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments disclosed and described herein are not limited to the precise arrangements and instrumentalities shown.

DETAILED DESCRIPTION OF THE PREFERRED EMBODIMENTS

Figure 1:
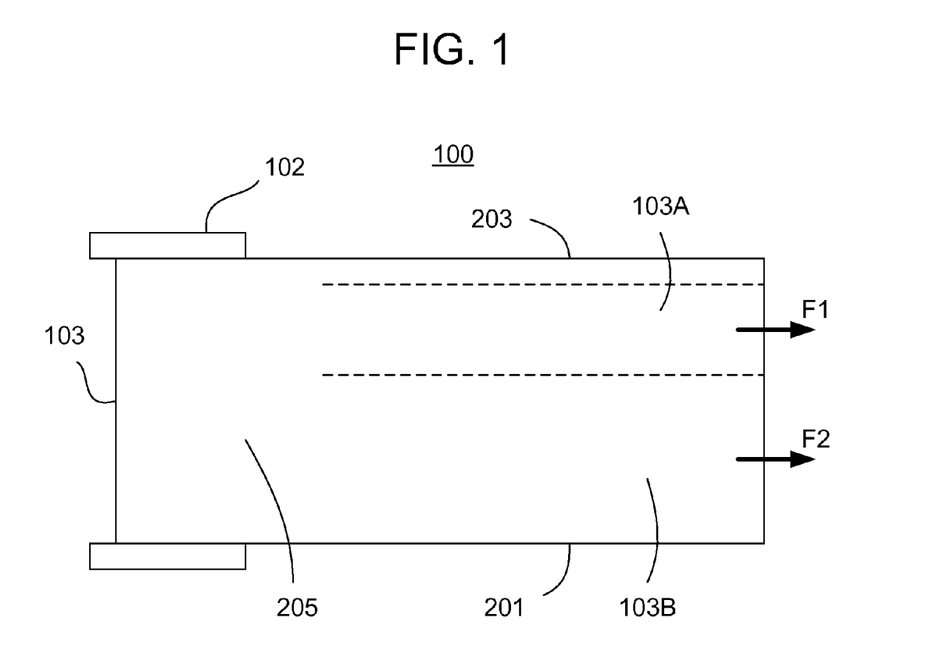
FIG. 1 is top schematic view of an apparatus for cutting a glass web into at least two glass ribbons, where the respective widths of each ribbon are not substantially equal.
Figure 2:
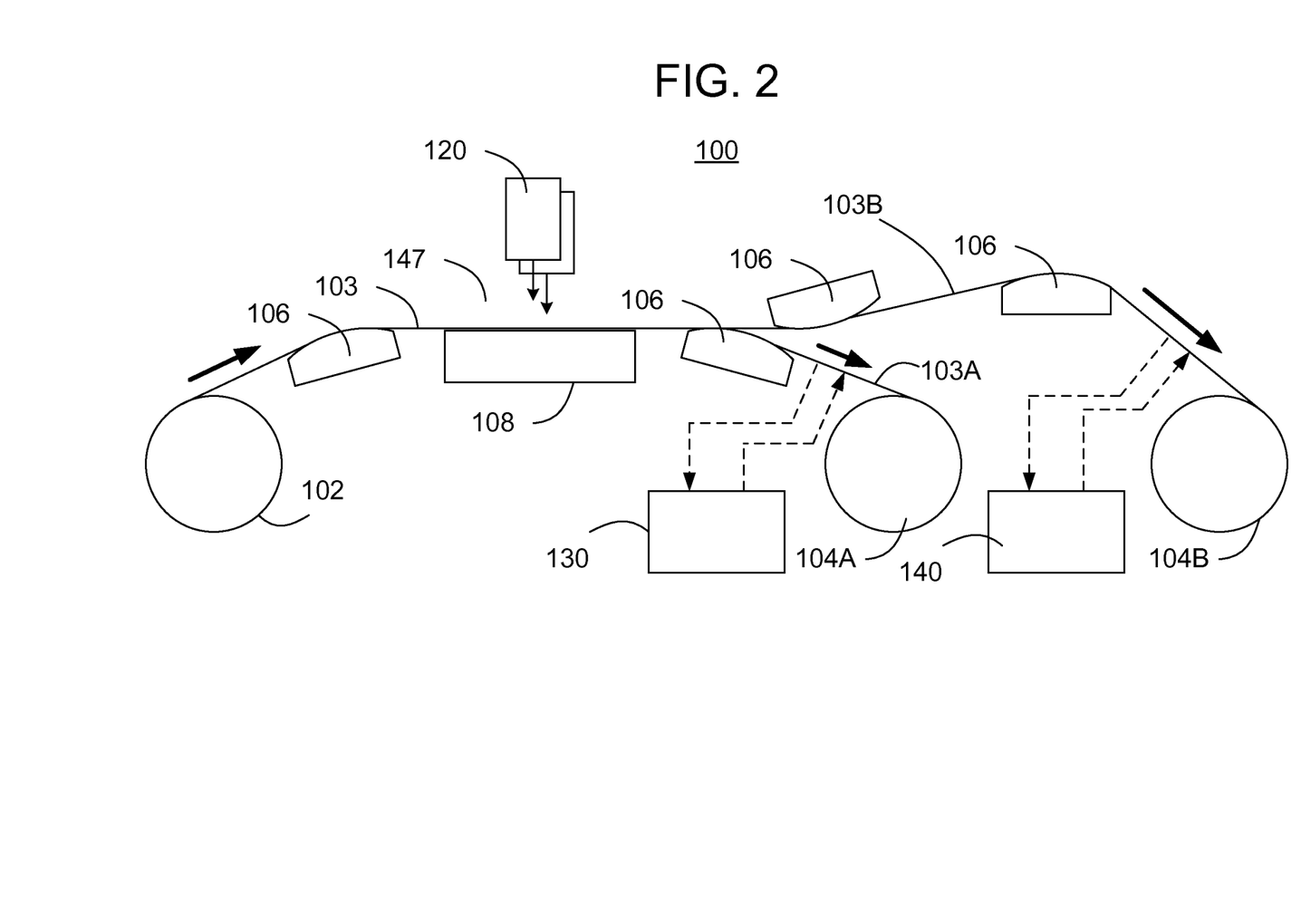
FIG. 2 is a side, elevational schematic view, which illustrates further details of the apparatus 100.

With reference to the drawings wherein like numerals indicate like elements there is shown in FIG. 1 a top schematic view of an apparatus 100 for cutting a glass web 103 (along the illustrated dotted lines) into at least two glass ribbons 103A, 103B, where the respective widths of each ribbon are not substantially equal. FIG. 2 is a side, elevational schematic view, which illustrates further details of the apparatus 100. In general, the apparatus 100 operates to source the glass web 103 and continuously move the glass web 103 from the source 102 to a destination zone in a transport direction along the length of the glass web 103 (illustrated by the arrows). During the transport of the glass web 103 from the source 102 to the destination zone, the glass web 103 is cut in a cutting zone 147 into the at least first and second glass ribbons 103A, 103B. The glass web 103 has a length (in the transport direction) and a width transverse to the length, and the respective widths of the first and second glass ribbons 103A, 103B will obviously be restrained within the overall width of the glass web 103. Again, and notably, the widths of the first and second glass ribbons 103A, 103B are not equal.

As the glass web 103 is often far wider than the width needed to meet a customer's specifications, and as a number of customers may require differing width material, the apparatus 100 is operable to accommodate cutting the glass ribbons 103A, 103B into such differing widths. Further, the specific widths of the glass ribbons 103A, 103B may be adjusted from batch-to-batch, thereby yielding the material for different customers using the same basic apparatus 100. As will be developed further herein, the apparatus 100 is therefore capable of simultaneously achieving a number of desirable features, including: (i) high glass utilization during the process, (ii) efficient use of the continuous transport apparatus 100 (i.e., eliminating multiple passes), and (iii) variability in ribbon width.

The glass web 103 may be provided by a wide range of sources, such as a down draw glass forming apparatus (not shown) in which a trough having a forming wedge permits molten glass to overflow the trough and flow down opposite sides of the forming wedge, where the respective flows are subsequently fused together as they are drawn off the forming wedge. This fusion down drawn process produces a glass web 103, which may be introduced into the transport mechanisms of the apparatus 100 for cutting.

It is noted that the glass web 103 would typically include a pair of opposed edge portions 201, 203 and a central portion 205 spanning between the opposed edge portions 201, 203. Due to the down draw fusion process, the edge portions 201, 203 of the glass ribbon may have corresponding beads of a thickness that is typically greater than a thickness of the central portion 205 of the glass web 103. The beads may be removed using the cutting techniques disclosed herein or other more conventional approaches.

Additionally or alternatively, the source of glass web 103 may include a coiled spool 102, where the glass web 103 is first wound onto the spool 102, e.g., following the fusion down draw process. Typically, the coiled spool 124 would be provided with a relatively large diameter to present a relatively low bending stress to accommodate the characteristics of the glass web 103. Once coiled, the glass web 103 may be uncoiled from the coiled spool 102 and introduced into the transport mechanisms of the apparatus 100.

The destination zone of the apparatus may include any suitable mechanisms for accumulating the respective glass ribbons 103A, 103B. In the example illustrated in FIG. 2, the destination zone includes first and second spools 104A, 104B, each spool receiving and winding one of the glass ribbons 103A, 103B. Again, the spools 104A, 104B should be provided with a relatively large diameter to present a suitable bend radius in order to accommodate the characteristics of the respective glass ribbons 103A, 103B.

The apparatus 100 includes a transport mechanism having a number of individual elements that cooperate to continuously move the glass web 103 from the source 102 to the destination spool 104 in the transport direction. This transport function may be accomplished without degrading the desirable characteristics of the edge portions 201, 203, the produced edges from the cutting operation, or either (pristine) side of the central portion 205 of the glass web 103. In short, the transport function is accomplished without degrading desirable characteristics of the individual glass ribbons 103A, 103B.

In particular, the apparatus 100 may include a plurality of noncontact support members 106, 108, rollers, etc., to guide the glass web 103 and glass ribbons 103A, 103B through the system from the source 102 to the destination spool 104. The non-contact support members 106, 108 may be flat and/or curved in order to achieve desirable directional conveyance of the respective work pieces. Each of the noncontact support members 106, 108 may include a fluid bar and/or a low friction surface in order to ensure that the glass web 103 and glass ribbons 103A, 103B are suitably conveyed through the system without damage or contamination. When a given non-contact support member 106, 108 includes an fluid bar, such element includes a plurality of passages and ports configured to provide a positive fluid pressure stream (such as air), and/or a plurality of passages and ports configured to provide a negative fluid pressure stream, to the associated surface of the glass web 103 and/or glass ribbons 103A, 103B in order to create an air cushion for such noncontact support. A combination of positive and negative fluid pressure streams may stabilize the glass web 103 and glass ribbons 103A, 103B during transport through the system.

Optionally, a number of lateral guides (not shown) may be employed proximate to the edge portions 201, 203 of the glass web 103 and/or glass ribbons 103A, 103B to assist in orienting the glass web 103 in a desired lateral position relative to the transport direction. For example, the lateral guides may be implemented using rollers configured to engage a corresponding one of the opposed edge portions 201, 203 of the glass web 103, and/or one or more edge portions of the glass ribbons 103A, 103B. Corresponding forces applied to the edge portions 201, 203 by the corresponding lateral guides may shift and align the glass web 103 in the proper lateral orientation as the glass web 103 is conveyed through the apparatus.

The apparatus 100 further includes a cutting mechanism 120 that operates to cut or sever the glass web 103 in the cutting zone 147 as the glass web 103 passes over, for example, the noncontact support member 108. As will be described in more detail later herein, the cutting mechanism 120 may make a single cut or simultaneous multiple cuts; however, a significant characteristic of the cutting process is that the resultant first and second glass ribbons 103A, 103B (and/or further numbers of ribbons) will exhibit different widths, i.e., asymmetrical separation.

Without suitable compensation, the separation of the glass web 103 into two glass ribbons 103A, 103B of asymmetrical widths will introduce the potential for stress and strain variations due to potential for unequal loading and/or micromotion (e.g., vibrations) in the cutting zone 147. Due to its high modulus, notch sensitivity and brittleness, however, the glass web 103 requires very consistent and symmetrical stress and strain fields in the cutting zone 147 in order to exhibit suitable edge characteristics (minimal fractures) after cutting. Therefore, in order to separate the glass web into multiple ribbons of unequal widths, the apparatus 100 includes a tensioning mechanism operating to provide consistent and symmetric stress fields and strain fields in the cutting zone 147. In accordance with one or more embodiments herein, tensioning is carefully and independently controlled in each of the glass ribbons 103A, 103B in order to achieve the consistent and symmetric stress and strain fields. This approach results in a very fine, particle free edge that minimizes edge and/or edge corner defects.

As will be developed in detail below, the tensioning mechanism operates to: (i) apply a first force F1 to the first glass ribbon 103A to place that ribbon in a first tension; and (ii) apply a second force F2 to the second glass ribbon 103B to place that ribbon in a second tension. Notably, the first and second forces F1, F2 are not equal. Indeed, in one or more embodiments, a ratio of the first force F1 to a first width of the first glass ribbon 103A is approximately equal to a ratio of the second force F2 to a second width of the second glass ribbon 103B. Inasmuch as the respective widths are not equal, adherence to the above ratios would require applying differing forces F1, F2. Further, the tensioning mechanism operates to independently vary the first force F1 and the second force F2 such that stresses and strains in the cutting zone 147 are symmetric.

In order to more fully appreciate the functionality provided by the tensioning mechanism, it is noted that tension is typically measured in PLI (pounds per linear inch). If one knows the PLI in a given glass web 103 and one wants to compute the total tension applied to the glass web 103, then one multiplies the PLI times the width of the glass web 103 in inches. Conversely, if one knows the total pounds of tension applied to the glass web 103 and one wants to compute the PLI, then one divides the total pounds of tension across the glass web 103 by the width of the web in inches.

In order to achieve the aforementioned tensioning functionality, one or more embodiments may provide for first and second tensioning mechanisms 130, 140, each operating to: (i) monitor one of the first tension and the second tension; (ii) determine whether the first tension and the second tension are within respective prescribed limits; and (iii) vary at least one of the first force F1 and the second force F2 based on the determination to ensure that the first tension and the second tension are within the respective prescribed limits. As schematically illustrated in FIG. 2 via dashed lines, each of the first and second tensioning mechanisms 130, 140 includes one or more means for sensing the tension in the respective glass ribbons 103A, 103B and a means for changing such tension if such tension is outside a prescribed range.

Any of a number of specific mechanisms may be employed to monitor the tension in the glass ribbons 103A, 103B, such as indirect tension monitoring and/or direct tension monitoring. An example of indirect tension monitoring provides for calculating tension levels by measuring the pressure in a pressure tap sensor, where the sensor receives the pressure in the air cushion provided below the associated glass ribbons 103A, 103B. An example of direct tension monitoring provides for measuring the load on one or more support structures of the apparatus 100, such as one or more of the noncontact support members 106, 108, a support shaft of a support roller, etc. Such load may be measured using a commercially available load cell. Another example of direct tension monitoring provides for measuring one or more of the torques on respective drive spindles of the source spool 102 and the destination spools 104 and computing the tension therefrom. Any number of other electronic sensors may be used alone or in combination with the aforementioned elements in order to compute the tension in each glass ribbon 103A, 103B.

The computation of the respective tensions in each of the glass ribbons 103A, 103B based on any number of inputs received from the aforementioned sensors may be accomplished using suitable computing equipment (not shown) running software programs of appropriate algorithms to convert the sensed quantities into the needed tensions. Such computing equipment may be implemented utilizing suitable hardware of any of the known technologies, such as commercially available or custom digital circuitry, any of the known processors that are operable to execute software and/or firmware programs, one or more programmable digital devices or systems, such as programmable read only memories (PROMs), programmable array logic devices (PALs), etc. Still further, the various embodiments herein may be implemented by way of software and/or firmware program(s) that may be stored on suitable storage medium or media (such as floppy disk(s), memory chip(s), etc.) for transportability and/or distribution.

In one or more embodiments, the tensioning mechanism 130, 140 may include a respective spool driving mechanism operating to apply independently variable rotational torque to the respective first and second spools 104A, 104B in order to apply the respective first and second tensions. In this regard, the sensed tension in each glass ribbon 103A, 103B is compared to one or more thresholds to determine whether such tensions are within a range of acceptable values. If one or more of the tensions are not within a range of acceptable values, then the tensioning mechanism 130, 140 increases or decreases the drive torque to one or more of the associated spools 104A, 104B to move the tension back into range. In this regard, it is noted that the torque required to provide a certain level of tension to a given one of the glass ribbons 103A, 103B is the total tension measured across the given ribbon times the roll radius of the destination spool 104. Thus, the torque driving the shaft of the destination spool 104 must decrease at a linear ratio relative to roll diameter as the roll increases in size on the destination spool 104 to keep tension constant. Additionally, the fact that the glass web 103 is unwinding from the source spool 102 will affect the tension in each glass ribbon 103A, 103B.

In one or more further embodiments, the first and second tensioning mechanisms 130, 140 may additionally or alternatively includes one or more tension adjustors operating to increase or decrease the tension in a given one or more of the glass ribbons 103A, 103B. By way of example, the first tensioning mechanism 130 may include a first tension adjustor disposed in the respective transport path between the cutting zone 147 and the first spool 104A. Additionally or alternatively, the second tensioning mechanism 140 may include a second tension adjustor disposed in the respective transport path between the cutting zone 147 and the second spool 104B. Each tension adjustor operates to independently vary the respective first and second tensions.

Figure 3A:
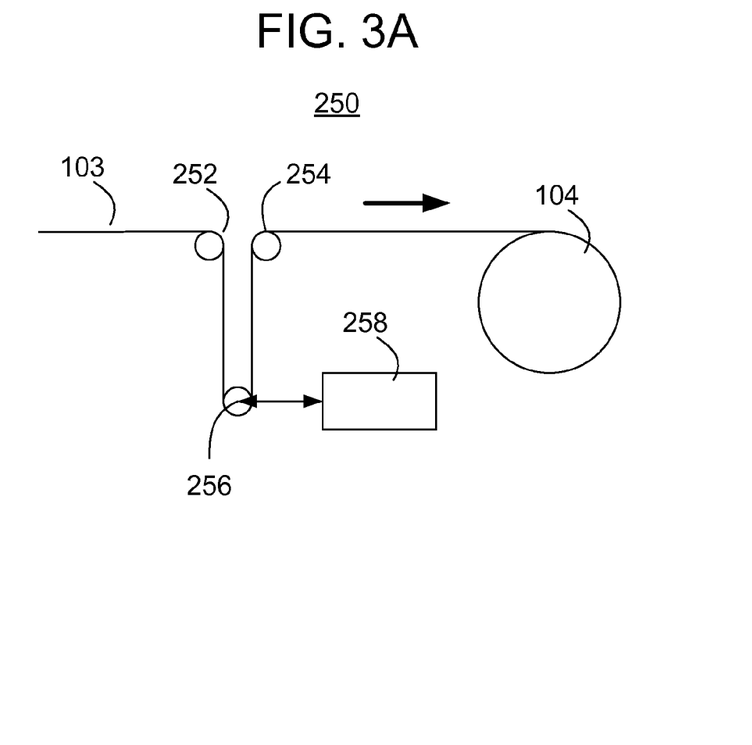
FIGS. 3A and 3B are schematic illustrations of respective tension adjusters, the former being an illustration of a dancer and the latter being an illustration of a vacuum box.
Figure 3B:
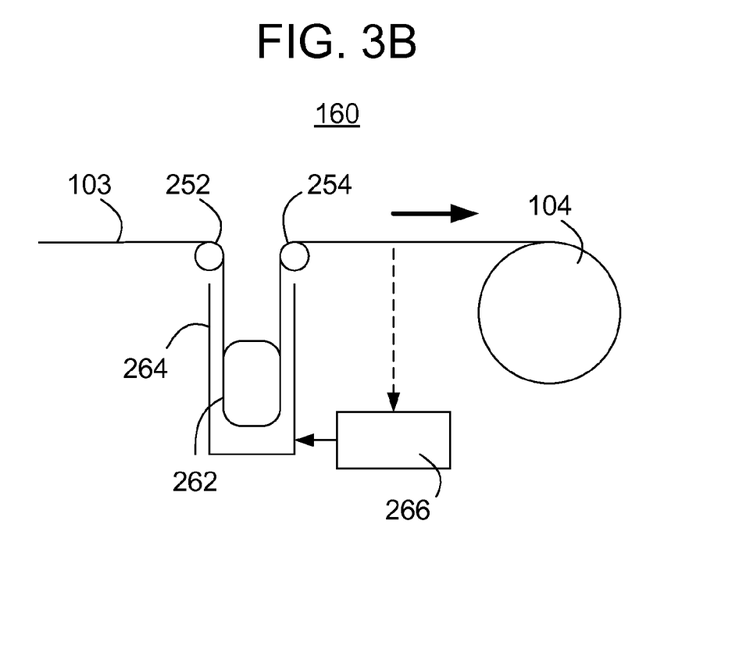

With reference to FIGS. 3A and 3B, the first and second tension adjusters may be implemented by way of any suitable technique known in the art, for example, using a dancer and/or a vacuum box. The illustrated example of the dancer assembly 250 includes a pair of rollers 252, 254, a weighted dancer roller 256, and a sensor 258. The sensor 258 monitors a position (in this case a vertical position) of the weighted dancer roller 256, and the control system (e.g., a computing device, etc.) determines whether the position is within limits, which is indicative of proper tension. If the position is not within limits, then the control system commands an increase or decrease in the drive torque to the spool 104 in order to move the position of the weighted dancer roller 256 within limits. It is preferable that the weighted dancer roller 256 is a non-contact device such as an air bearing to preserve the surface quality of the glass web.

The illustrated example of the vacuum box 260 includes a pair of rollers 252, 254, an actuator 262, and a vacuum control 266. The vacuum control 266 receives an indication of the tension via a sensor (not shown) such as a load cell roller or the like, and the vacuum control 166 determines whether the tension is within limits. If the tension not within limits, then the vacuum control 266 commands an increase or decrease in the vacuum within the box 264, which causes the actuator 262 to increase to decrease the tension and move same within limits.

Figure 4:
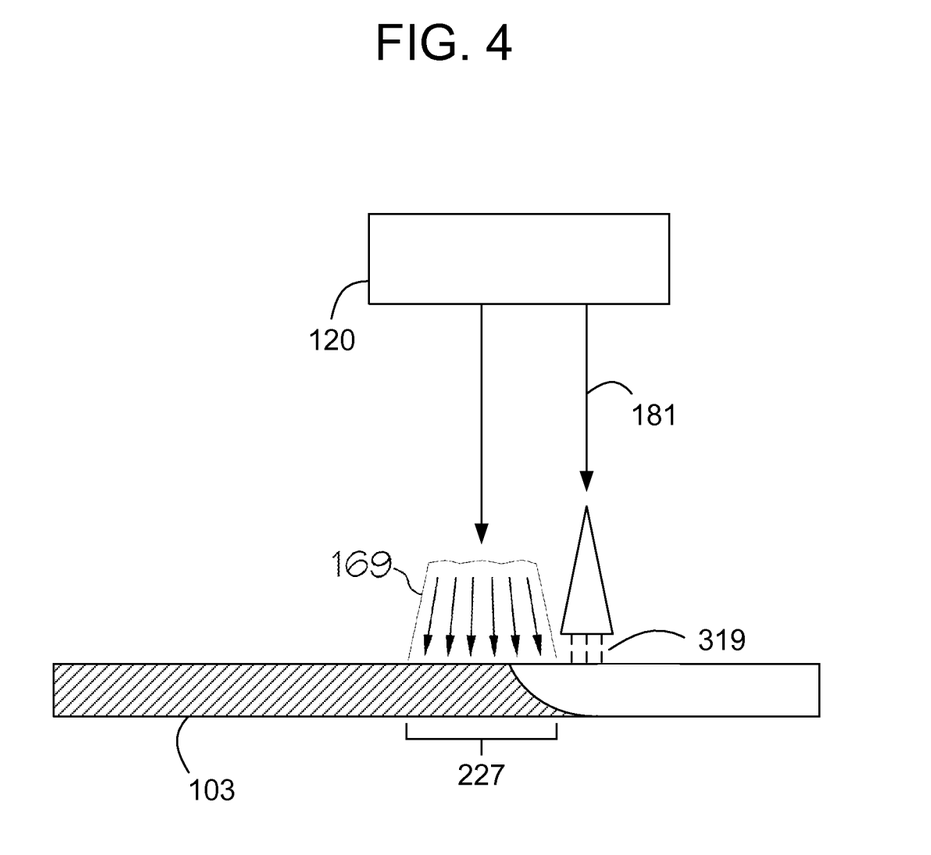
FIG. 4 is a schematic illustration of a cutting mechanism ion which an optical delivery apparatus and a cooling fluid source operate to propagate a fracture in the glass web to produce the at least two glass ribbons.

With reference to FIG. 4, in one or more embodiments, the cutting mechanism 120 may include an optical delivery apparatus for heating an elongated zone of the glass web 103, and a cooling fluid source operating to apply coolant to the heated portion of the glass web 103 to propagate a fracture in the transport direction, thereby producing the first and second glass ribbons 103A, 103B. The optical delivery apparatus may include a radiation source, such as a laser, although other radiation sources may be employed. The optical delivery apparatus may further include other elements to shape, adjust direction and/or adjust the intensity of an optical beam 169, such as one or more polarizers, beam expanders, beam shaping apparatus, etc. Preferably, the optical delivery apparatus produces a laser beam 169 having a wavelength, power, and shape suitable for heating the glass web 103 at a location on which the laser beam 169 is incident.

It has been found that a laser beam 169 of significantly elongated shape works well. The boundary of the elliptical footprint of the laser beam 169 may be determined as the point at which the beam intensity has been reduced to $1/e^2$ of its peak value. The elliptical footprint may be defined by a major axis that is substantially longer than a minor axis. In some embodiments, for example, the major axis may be at least about ten times longer than minor axis. However, the length and width of an elongated radiation heated zone 227 are dependent upon the desired severing speed, desired initial crack size, thickness of the glass ribbon, laser power, etc., and the length and width of the radiation zone may be varied as needed.

The cooling fluid source 181 operates to cool the heated portion of glass web 103 by application of cooling fluid, preferably a jet of fluid, such as though a nozzle or the like. The geometry of the nozzle, etc., may be varied as needed for the particular process conditions. The cooling fluid may include water, however, any other suitable cooling fluid or mixture may be employed that does not damage the glass web 103. The cooling fluid is preferably delivered to the surface of the glass web 103 to form a cooling zone 319, where the cooling zone 319 may trail behind the elongated radiation zone 227 to propagate a fracture (initiated by an induced crack). The combination of heating and cooling effectively severs the glass web 103 to create the respective glass ribbons 103A, 103B while minimizing or eliminating undesired residual stress, micro-cracks or other irregularities in edge(s) created by the cut.

In accordance with one or more embodiments, the cutting mechanism 120 may include multiple heating/cooling apparatus arranged across the glass web 103 in order to produce multiple simultaneous cuts. The positions of the respective heating/cooling apparatus are adjustable in order to meet particular customer requirements as to the widths of the glass ribbons. Along with such adjustment in width, however, the tensioning mechanism is likewise adjusted to apply the proper tension to each glass ribbon such that there are no undesirable stresses and/or strains in the respective cutting zones.

Figure 5A:
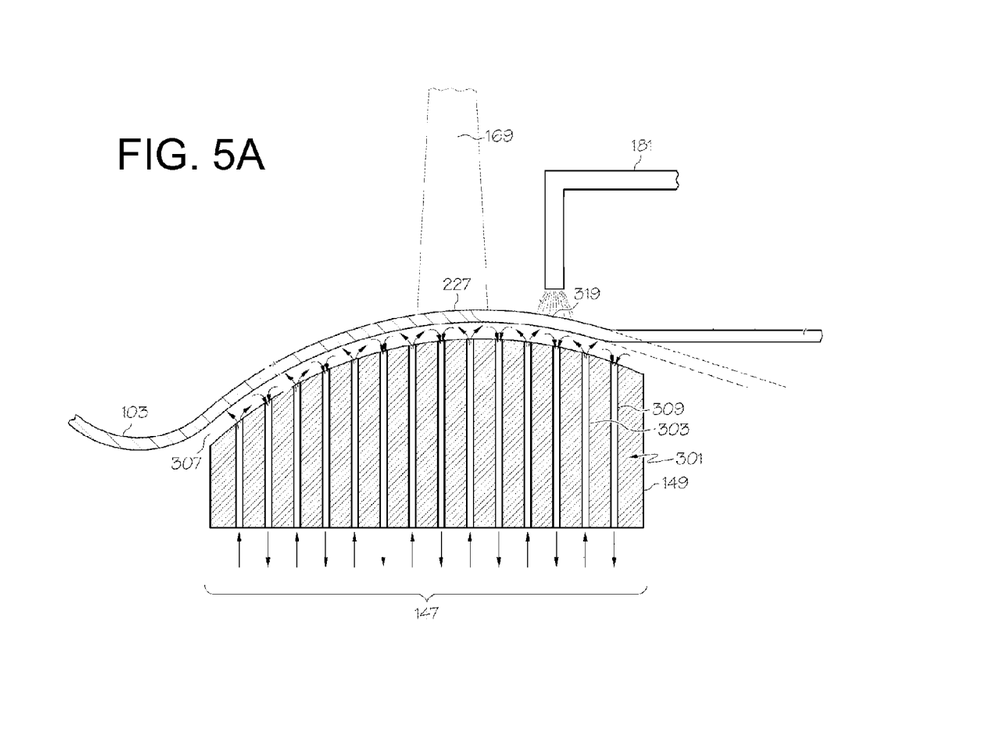
FIGS. 5A and 5B illustrate side-sectional views of an alternative technique of processing the glass web in the cutting zone to achieve improved characteristics.
Figure 5B:
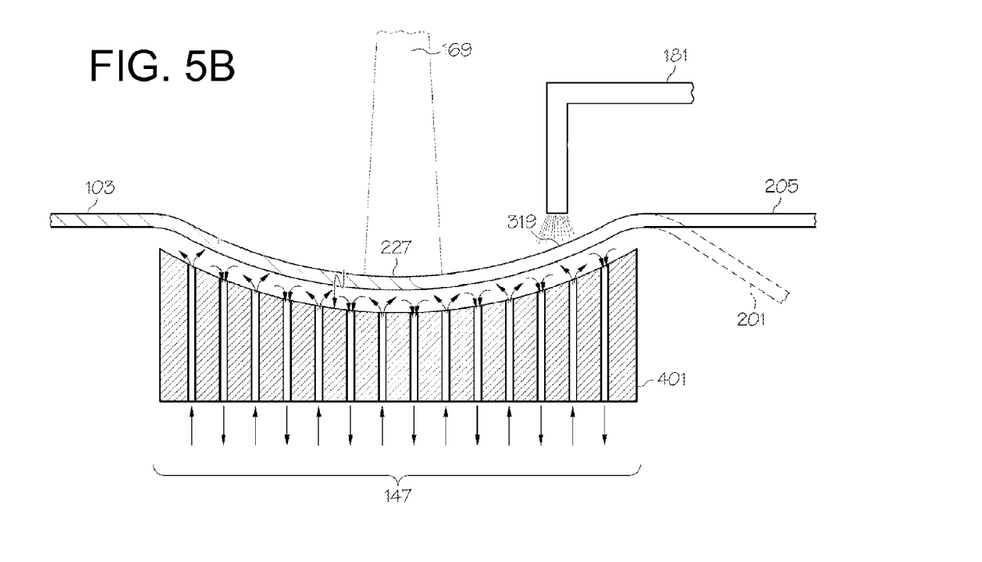

Reference is now made to FIGS. 5A and 5B, which illustrate side-sectional views of an alternative technique of processing the glass web 103 in the cutting zone to achieve improved characteristics. In particular, the apparatus 100 may include a bending support member 149 or a bending support member 401 in the cutting zone 147, operating to bend the glass web 103 either convexly or concavely. Bending the glass web 103 within the cutting zone 147 may help stabilize the glass web 103 during the cutting procedure. Such stabilization can help prevent buckling or disturbing the profile of the glass web 103 during the cutting procedure. Providing a bent target segment of the glass web 103 in the cutting zone 147 can also increase the rigidity of web throughout the cutting zone 147.

Either cutting support member 149, 401, if provided, may include the aforementioned non-contact cutting support technology to support the glass web 103 without touching the opposed faces thereof. In particular, whichever cutting support member 149, 401 is employed may include a plurality of conduits 301 including passages and ports 303 configured to provide a positive fluid pressure stream (such as air), and/or a plurality of passages and ports 309 configured to provide a negative fluid pressure stream, to the associated surface of the glass web 103 and/or glass ribbons 103A, 103B in order to create an air cushion 307 for such noncontact support. A combination of positive and negative fluid pressure streams may stabilize the glass web 103 and glass ribbons 103A, 103B during transport through the system.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

What is claimed is:

1. A method, comprising:
    sourcing a glass web, the glass web having a length and a width transverse to the length;
    continuously moving the glass web from the source to a destination in a transport direction along the length of the glass web; and asymmetrically cutting the glass web at a cutting zone into at least first and second glass ribbons as the glass web is moved from the source to the destination, the first glass ribbon having a first width and the second glass ribbon having a second width, wherein the first and second widths are not equal;
    applying a first force to place the first glass ribbon in a first tension; and applying a second force to place the second glass ribbon in a second tension, wherein the first and second forces are not equal; and
    independently varying the first force and the second force such that stresses and strains in the cutting zone are symmetric for the first and second ribbons.

2. The method of claim 1, wherein a ratio of the first force to the first width is approximately equal to a ratio of the second force to the second width.

3. The method of claim 2, wherein the source is a source spool of relatively thin glass web and the destination includes a first spool for receiving and winding the first glass ribbon, and a second spool for receiving and winding the second glass ribbon.

4. The method of claim 2, wherein the source is a source of down drawn glass web.

5. The method of claim 2, wherein the step of asymmetrically cutting the glass web at the cutting zone includes heating an elongated zone of the glass web using an optical delivery apparatus followed by cooling the heated portion of the glass web to propagate a fracture in the transport direction, thereby producing the first and second ribbons.

6. The method of claim 5, further comprising bending the glass web in the cutting zone, wherein such bending is one of convex and concave.

7. The method of claim 1, further comprising: monitoring the first tension and the second tension; determining whether the first tension and the second tension are within respective prescribed limits; and varying at least one of the first force and the second force based on the determination to ensure that the first tension and the second tension are within the respective prescribed limits.

8. The method of claim 7, wherein the steps of continuously moving the glass web, monitoring, determining, and varying are carried out without contacting the glass sheet.

9. The method of claim 1, wherein the source is a source spool of relatively thin glass web and the destination includes a first spool for receiving and winding the first glass ribbon, and a second spool for receiving and winding the second glass ribbon.

10. The method of claim 1, wherein the source is a source of down drawn glass web.

11. The method of claim 1, wherein the step of asymmetrically cutting the glass web at the cutting zone includes heating an elongated zone of the glass web using an optical delivery apparatus followed by cooling the heated portion of the glass web to propagate a fracture in the transport direction, thereby producing the first and second ribbons.

12. The method of claim 11, further comprising bending the glass web in the cutting zone, wherein such bending is one of convex and concave.

13. A method, comprising:
    sourcing a glass web, the glass web having a length and a width transverse to the length;
    continuously moving the glass web from the source to a destination in a transport direction along the length of the glass web;
    cutting the glass web at a cutting zone into at least first and second glass ribbons as the glass web is moved from the source to the destination, the first glass ribbon having a first width and the second glass ribbon having a second width, wherein the first and second widths are not equal;
    applying a first force to place the first glass ribbon in a first tension; and applying a second force to place the second glass ribbon in a second tension, wherein the first and second forces are not equal;
    independently varying the first force and the second force such that stresses and strains in the cutting zone are symmetric for the first and second ribbons;
    monitoring the first tension and the second tension;
    determining whether the first tension and the second tension are within respective prescribed limits; and
    varying at least one of the first force and the second force based on the determination to ensure that the first tension and the second tension are within the respective prescribed limits, wherein the steps of continuously moving the glass web, monitoring, determining, and varying are carried out without contacting the glass sheet.

14. The method of claim 13, wherein a ratio of the first force to the first width is approximately equal to a ratio of the second force to the second width.

15. The method of claim 13, wherein the source is a source spool of relatively thin glass web and the destination includes a first spool for receiving and winding the first glass ribbon, and a second spool for receiving and winding the second glass ribbon.

16. The method of claim 13, wherein the source is a source of down drawn glass web.

17. The method of claim 13, wherein the step of cutting the glass web at the cutting zone includes heating an elongated zone of the glass web using an optical delivery apparatus followed by cooling the heated portion of the glass web to propagate a fracture in the transport direction, thereby producing the first and second ribbons.

18. The method of claim 17, further comprising bending the glass web in the cutting zone, wherein such bending is one of convex and concave.

* * * * *